United States Patent

[11] 3,571,790

[72] Inventor Walter D. Lusebrink
20024 Edmunton Drive, St. Clair Shores, Mich. 48080
[21] Appl. No. 679,765
[22] Filed Nov. 1, 1967
[45] Patented Mar. 23, 1971

[54] VEHICLE EXTERNAL SPEED INDICATOR
7 Claims, 1 Drawing Fig.
[52] U.S. Cl................................................ 340/62, 340/241, 116/65
[51] Int. Cl................................................. B60q 1/54
[50] Field of Search........................................... 340/62; 116/37, 39, 65 (Inquired); 73/502; 340/136; 340/262, 241

[56] References Cited
UNITED STATES PATENTS
| | | | |
|---|---|---|---|
| 3,474,752 | 10/1969 | Goodell........................ | 340/241X |
| 1,685,330 | 9/1928 | Maroney...................... | 116/65 |
| 3,213,691 | 10/1965 | Thorner....................... | 73/502X |

Primary Examiner—Donald J. Yusko
Assistant Examiner—Michael Slobasky
Attorney—Barnes, Kisselle, Raisch & Choate ABSTRACT: This patent discloses a vehicle speed and direction of travel visual indicator adapted for mounting on an external surface of the vehicle. The device employs a signal element the displacement of which indicates the speed, acceleration and deceleration of the vehicle and a rotating signal ball which indicates in all directions when the brakes of the vehicle are applied. The direction of travel of the vehicle is indicated by suitable color coding of the signal element.

PATENTED MAR 23 1971
3,571,790
FIG.1
FIG.2
FIG.3
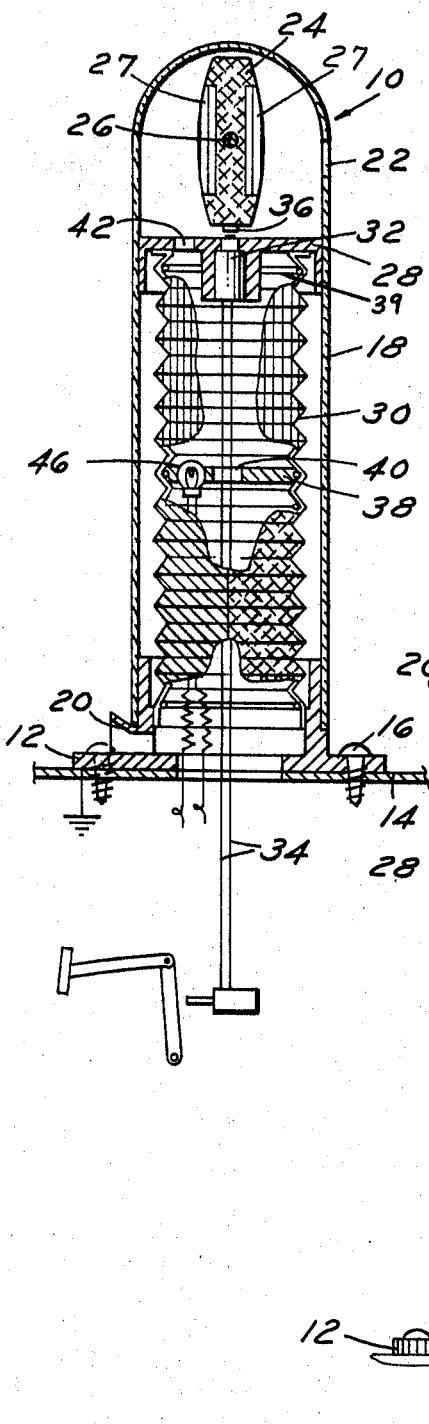
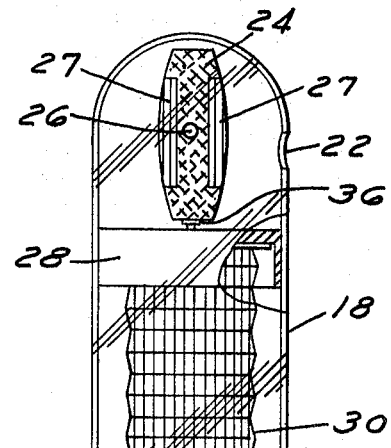
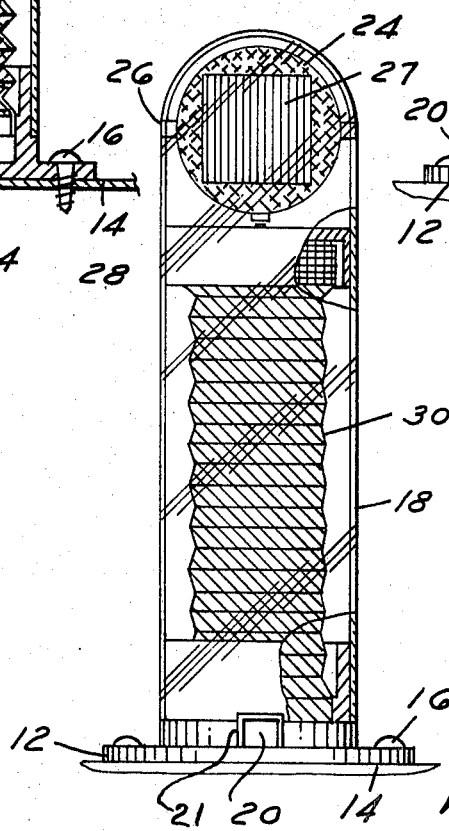
INVENTOR
WALTER D. LUSEBRINK
BY
Barnes, Kisselle, Raisch & Choate
ATTORNEYS 3,571,790

1

VEHICLE EXTERNAL SPEED INDICATOR

BACKGROUND OF THE INVENTION

The invention relates to improvements in externally mounted vehicle speed indicator and signal devices.

In brief, this invention utilizes a flexible accordionlike signal element which is displaced by the air stream created by a moving vehicle. The total displacement of the signal element is proportional to the speed or velocity of the airstream and hence gives a visual indication of the speed of the vehicle. The airstream also activates a multicolored signal ball causing it to rotate at variable speeds and mix colors, thereby warning other persons of the approach of the vehicle. A means, actuated by application of the vehicle's brakes, of stopping the rotation of the ball also warns other persons the vehicle is braking to a stop.

The closest known prior art reference is the inventor's Pat. No. 3,320,920. Some of the embodiments of this reference disclose a signal ball mounted for rotational movement actuated by an air stream impinging on vanes of the signal ball. However, this reference does not disclose a device in which the signal ball is but one element, which provides a visual indication of the speed, direction of travel, acceleration, deceleration and application of the brakes of the vehicle.

DESCRIPTION OF THE INVENTION

This invention relates to improvements in signal devices and more particularly to a device to be externally mounted on a vehicle which provides a visual indication of the approximate speed, direction of travel, acceleration and deceleration of the vehicle.

A principal object of this invention is to provide a visual indication of the speed or rate of travel of the vehicle on which the device is mounted.

Another object of this invention is to provide a visual indication, visible in all directions, that the brakes of the vehicle to which the device is attached have been applied.

Another object of this invention is to provide a visual indication of the direction of travel of the vehicle on which this device is utilized.

Another object of this invention is to provide a visual indication that the vehicle on which this device is mounted has come to a complete stop.

Another object of this invention is to provide a visual indication of the acceleration and deceleration of the vehicle on which the device is mounted.

Another object of this invention is to provide a signal element which is both internally lighted and reflects light from external sources, thereby making it readily visible.

Other objects and features of this invention will be apparent from the following description and claims in which there is found the manner of making and using the invention and the best mode contemplated by the inventor for carrying out the invention.

Drawings accompany this disclosure and the various views thereof may be briefly described as:

FIG. 1, a sectional side elevational view of the signal device showing the position of the signal element when the vehicle is traveling at an intermediate speed.

FIG. 2, a side elevational view of the device showing the position of the signal element when the vehicle is stopped.

FIG. 3, a side elevational view of the signal device showing the position of the signal element when the vehicle is traveling at its maximum speed.

Referring to the drawings:

In FIG. 1, a signal device main body designated generally as 10 having a flange 12 is shown mounted on an exterior surface of a vehicle 14 such as a roof, front hood, grille or rear deck by suitable screws 16. A transparent portion or envelope 18 formed from glass or plastic material and having an air inlet 20 with an air scoop 21 in its lower portion and 180° from the inlet and air outlet 22 in its upper portion is mounted on the flange of the main body. A plurality of small openings (not shown) may be utilized in place of the single opening 20 or 22. A signal means or oval-shaped ball 24 is pivotally mounted on a shaft 26 in the upper portion of the transparent envelope 18 and has two rectangular signal surfaces 27. Preferably the signal ball 24 is relatively lightweight to minimize any inertia problems. The signal surfaces 27 are colored red and the remainder of the oval-shaped ball is yellow. Positioned below the signal ball 24 is a mounting plate 28 which is suitably attached to the transparent envelope 18. A resilient flexible accordionlike signal element 30 is attached at one end to the mounting plate 28 and at its other end to the flange 12. The top portion of the accordian signal element 30 is colored red and the bottom portion is colored yellow on one side and green on the other side.

A positioning means or solenoid 32 is suitably attached to the mounting plate 28 and connected to a vehicle's brake light system by suitable electrical connectors 34. The solenoid 32 is positioned so that it will engage a positioning stop 36 on the signal ball 24 when it is activated by the vehicle brake light system. When the solenoid 32 is activated, it stops the rotating signal ball 24 in such a position that the red signal surfaces 27 are visible from both sides of the signal device 10. When the signal ball is stopped in this position it restricts or reduces the rate of fluid or air flow through the signal element 30, thereby increasing the rate at which the element 30 returns to its normal or undisplaced position. In the preferred embodiment of this device the stop 36 is magnetized and the tip of the positioning means 32 is ferrous.

A valve 38 is positioned in and attached to the signal element 30. In one embodiment of this device, the weight of the valve 38 is such that it is just sufficient to stretch or elongate the red or top portion of the signal element so that only the red portion of the signal element is readily visible through the transparent envelope when the main body is in an upright position (as shown in FIG. 2). A light spring 39 can also be positioned with the accordionlike signal element so that it biases the valve 38 toward the air inlet 20 end of the envelope 18. This spring could be an integral part of the accordionlike signal element 30. With this arrangement the device is not dependent on the effect of gravity on the weighted valve 38 to urge the valve and a portion of the signal element 30 toward the air inlet end of the envelope 18, hence the signal device will function in both the horizontal and vertical positions.

In its operational environment the device is mounted on a vehicle in such a position that a stream of air is able to enter the opening 20 in the envelope 18 when the vehicle is traveling forward. The stream of air that enters the opening 20 passes into the signal element 30 and through an opening 40 in the valve 38, then through a directing means or aperture 42 in the mounting plate 28 where it strikes or impinges on the outer surfaces of the oval-shaped signal ball 24 and then the air stream exits from the upper portion of the envelope 18 through the opening 22 which is positioned toward the rear of the vehicle. When the airstream passes through the opening 40 in the valve 38, it causes the valve 38 to rise in the envelope 18; thereby making the yellow green portion of the signal element 30 visible through the envelope 18. The faster the vehicle travels, the higher the valve 38 rises in the envelope 18 thereby exposing to view more and more of the yellow green portion and less and less of the red portion of the signal element 30. By a proper design of the resiliency of the signal element 30 and the weight of the valve 38 or the force developed by the spring in the second embodiment, it is possible for only the red portion of the signal element to be visible when the vehicle is stopped, approximately equal red and yellow green portions of the signal element to be visible when the vehicle is traveling at 50 miles per hour, and for only the yellow green portion of the signal element to be visible when the vehicle vehicle is traveling at 75 or more miles per hour. When the vehicle is moving, the air stream which passes through the directing means or aperture 42 in the mounting plate 28 and the signal ball 24 causes the ball to rotate as long as the solenoid 32 is deenergized. When the brakes of the vehicle are applied and the positioning means or solenoid is energized, it stops the signal ball from rotating in such a position that the red signal surfaces 27 of the ball 24 are visible from the front and rear of the vehicle. This arrangement visually indicates when the brakes of the vehicle have been applied.

The direction of travel of the vehicle relative to the viewer is indicated by the yellow green portion of the signal element 30. The main body 10 of the device is positioned on the vehicle so that only the yellow portion of the signal element 30 is visible to the viewer than the vehicle is traveling away from the viewer and the green portion of the signal element is only visible when the vehicle is traveling toward the viewer.

If the signal element is colored with a translucent material which reflects light from an exterior source and transmits light from an interior source, the intensity of both the transmitted and reflected light would vary or fluctuate as the angular relationship of the various surfaces of the accordionlike signal element is changed due to the displacement of the signal element which is caused by the air passing through the signal element and control valve. The variation of the intensity of the light would be caused by the interference and reinforcement of the various beams of reflected and refracted light from the various surface areas of the signal element.

To improve the visibility of the signal element 30, the red, yellow and green surfaces can be composed of a colored material which will reflect light from an external source and which will pass or transmit light from a source within the signal element 30. In one embodiment of this device a light source 46 is mounted in the valve 38 which can be made of a transparent material such as plastic so that the valve 38 acts as a light pipe and transmits light to the outer edge of the valve. The outer edge of the valve would serve as a bright marker which would separate the red and yellow green portions of the signal element and the light embedded in the valve would provide an internal light source for the signal element 30.

This disclosure is to only be considered as illustrative of a specific embodiment of the invention and since numerous modifications and changes in the disclosed structure will readily occur to those skilled in the art, it is not intended to limit the invention to the specific embodiment disclosed in this structure; and accordingly, all suitable modifications and equivalents may be resorted to falling within the scope of the invention as claimed.

I claim:

1. A vehicle signal and warning device which comprises:
   a. a main body having a transparent portion with one or more air inlets and outlets, said inlets being open to ambient impact air surrounding the vehicle,
   b. a resilient accordionlike signal element encased within the main body, positioned so that it is at least partially visible through the transparent portion and so that it communicates with the inlets and outlets, with both ends of the element attached to the body,
   c. a valve positioned within and attached to the signal element between an inlet and an outlet, whereby the valve and a portion of the signal element is displaced relative to the main body by a stream of ambient air passing into the air inlets and through the signal element, valve and air outlets at a rate directly responsive to vehicle speed,
   d. a signal means mounted in the main body for rotational movement within the transparent portion of the body and having signal surfaces and a plurality of vanes,
   e. a means of directing an air stream to impinge on the vanes of the signal means, and
   f. a means of selectively positioning the signal surfaces of the signal means relative to the main body, whereby the directing means causes an air stream passing through the signal element to impinge on the vanes thereby imparting a rotational movement to the signal means and actuation of the positioning means prohibits the rotation of the signal means and positions the signal surfaces relative to the transparent portion of the main body.

2. A vehicle signal and warning device as defined in claim 1 in which:
   a. the signal means is a generally spherical-shaped ball having integral vane surface areas, a positioning stop, and two generally hemispherical signal surfaces,
   b. the directing means is a plate with an aperture through it enclosed in the main body and positioned between the signal means and the signal element, and
   c. the positioning means is a solenoid mounted on the plate and positioned so that it will engage the positioning stop when it is activated.

3. A vehicle signal and warning device as defined in claim 2 in which the valve is weighted.

4. A vehicle signal and warning device as defined in claim 2 in which a resilient biasing means urges the valve and a portion of the signal element toward the air inlet end of the transparent portion of the main body.

5. A vehicle signal and warning device which comprises:
   a. a main body having a transparent portion with one or more air inlets and outlets, said inlets being open to ambient impact air surrounding the vehicle,
   b. a resilient accordionlike signal element encased within the main body, positioned so that it is at least partially visible through the transparent portion and so that it communicates with the inlets and outlets, with both ends of the element attached to the body,
   c. a valve positioned within and attached to the signal element between an inlet and an outlet, whereby the valve and a portion of the signal element is displaced relative to the main body by a stream of ambient air passing into the air inlets and through the signal element, valve and air outlets at a rate directly responsive to vehicle speed, the valve being composed at least in part of a transparent material, and
   d. a light source embedded in the valve whereby the valve acting as a light pipe provides a band of light between two portions of the signal element.

6. A vehicle signal and warning device as defined in claim 5 in which the accordionlike signal element is composed of a translucent material which reflects light from a source outside of the signal element and permits light from the source within the signal element to be transmitted through the element, whereby the intensity of the transmitted and reflected light varies as the angular relationship of the accordionlike surfaces of the signal element to each other is varied.

7. A speed responsive signal device comprising:
   a. a housing having transparent walls adapted for mounting on a vehicle,
   b. a relatively flat disclike rotor mounted for rotation on an axis between opposed walls of said housing in a direction transverse to the normal direction of motion of the vehicle, and
   c. said housing having an inlet opening positioned to direct impact air resulting from motion of said housing to rotate said rotor, and an outlet opening to exhaust said impact air.